(12) United States Patent
Malfer et al.

(10) Patent No.: US 8,557,003 B2
(45) Date of Patent: *Oct. 15, 2013

(54) MANNICH DETERGENTS FOR HYDROCARBON FUELS

(75) Inventors: Dennis J. Malfer, Glen Allen, VA (US); May D. Thomas, Richmond, VA (US)

(73) Assignee: Afton Chemical Corporation, Richmond, VA (US)

( * ) Notice: Subject to any disclaimer, the term of this patent is extended or adjusted under 35 U.S.C. 154(b) by 758 days.

This patent is subject to a terminal disclaimer.

(21) Appl. No.: 12/230,947

(22) Filed: Sep. 8, 2008

(65) Prior Publication Data

US 2009/0071065 A1 Mar. 19, 2009

Related U.S. Application Data

(63) Continuation-in-part of application No. 11/639,200, filed on Dec. 15, 2006.

(60) Provisional application No. 60/970,584, filed on Sep. 7, 2007.

(51) Int. Cl.
*C10L 1/18* (2006.01)

(52) U.S. Cl.
USPC .......................................................... 44/415

(58) Field of Classification Search
USPC .......................................................... 44/415
See application file for complete search history.

(56) References Cited

U.S. PATENT DOCUMENTS

| | | | |
|---|---|---|---|
| 4,025,316 A | 5/1977 | Stover | |
| 4,231,759 A | 11/1980 | Udelhofen et al. | |
| 4,906,252 A | 3/1990 | Gutierrez et al. | |
| 5,017,299 A | 5/1991 | Gutierrez et al. | |
| 5,066,764 A * | 11/1991 | Casey et al. | 528/122 |
| 5,634,951 A | 6/1997 | Colucci et al. | |
| 5,646,098 A | 7/1997 | Brois | |
| 5,725,612 A | 3/1998 | Malfer et al. | |
| 6,048,373 A * | 4/2000 | Malfer et al. | 44/415 |
| 6,511,519 B1 * | 1/2003 | Ahmadi et al. | 44/385 |
| 2005/0066572 A1 | 3/2005 | Colucci et al. | |

FOREIGN PATENT DOCUMENTS

| | | |
|---|---|---|
| CN | 1197835 A | 11/1998 |
| EP | 0 870 819 A2 | 10/1998 |
| EP | 1 293 553 A2 | 3/2003 |
| EP | 1 295 933 A2 | 3/2003 |
| EP | 1 840 192 A1 | 10/2007 |
| WO | 00/78898 A1 | 12/2000 |

OTHER PUBLICATIONS

Maurillo Tramontini and Luigi Angiolini, Mannich Bases—Chemistry and Uses, 1994, CRC Press, p. 48.

Xing Xueyong et al., "The Research and Development of Gasoline Detergent Containing Mannich Bases," Chemical Engineering Design Communications, vol. 32, No. 1, Mar. 2006, pp. 54-56 and 60, English Abstract (1 page).

Danish Patent and Trademark Office, Singapore Written Opinion and Search Report for Singapore Patent Application No. 200717446-9 dated Jul. 25, 2008 (15 pages).

French Patent Office Preliminary Search Report and Written Opinion for French Patent Application No. 0755827 dated Jan. 15, 2010 (5 pages).

* cited by examiner

*Primary Examiner* — Cephia D Toomer
(74) *Attorney, Agent, or Firm* — Fitch, Even, Tabin & Flannery, LLP; Dennis H. Rainear

(57) ABSTRACT

New, highly effective substantially pure Mannich detergents for use in hydrocarbon fuels reduce engine deposits in spark and compression ignition internal combustion engines. The Mannich condensation reaction products are obtainable by reacting: (i) a polyamine having primary amino groups, (ii) a hydrocarbyl-substituted hydroxyaromatic compound, and (iii) an aldehyde, wherein the reaction is conducted at in a molar ratio of (i):(ii):(iii) of approximately 1:2:3 or 1:1:2. The Mannich detergent compounds may be dispersed in a liquid carrier to provide a fuel additive concentrate for hydrocarbon engine fuels which effectively control engine deposit formation in intake valves, port fuel injectors and combustion chambers.

49 Claims, No Drawings

MANNICH DETERGENTS FOR HYDROCARBON FUELS

CROSS-REFERENCE TO RELATED APPLICATIONS

This application claims priority based on U.S. Provisional Patent Application Ser. No. 60/970,584, filed Sep. 7, 2007, and is a continuation-in-part of U.S. application Ser. No. 11/639,200, filed Dec. 15, 2006, the entire disclosures of which are hereby incorporated herein by reference.

FIELD OF THE INVENTION

This invention relates to novel Mannich base condensation products and fuel compositions comprising said Mannich products that are effective in controlling engine deposits in internal combustion engines.

BACKGROUND OF THE INVENTION

Deposits tend to build up inside an engine unless gasoline contains effective deposit control additives. Since most base gasolines are formulated to similar regulated specifications, the performance of the deposit control additives can be very important in differentiating different gasoline brands from a performance standpoint. Over the years considerable work has been devoted to developing additives for controlling (preventing or reducing) deposit formation, particularly in the fuel induction systems of spark-ignition internal combustion engines.

Additives that can effectively control engine deposits have been the focus of considerable research activities in the field, yet further improvements are desired.

SUMMARY OF THE INVENTION

The invention provides Mannich reaction products having robust detergency properties in hydrocarbon fuels effective to provide improved deposit control in spark and compression ignition internal combustion engines. These detergent compounds are provided as Mannich condensation reaction products of: (i) a polyamine having primary amino groups, (ii) a hydrocarbyl-substituted hydroxyaromatic compound, and (iii) an aldehyde, wherein the Mannich reaction is conducted at an overall molar ratio of (i):(ii):(iii) such that, for example, the polyamine (i) is reactable with the hydrocarbyl-substituted hydroxyaromatic compound (ii) so as to obtain the substantially pure intermediate, which intermediate is reactable with the aldehyde (iii) to obtain the Mannich reaction product as a substantially pure product.

An important feature of this invention is conducting the Mannich condensation reaction such that the reaction product is substantially pure, especially in a process that is readily scaled up and can be conducted as a so-called "one pot" process. These Mannich reaction products provide not only improved control of intake valve deposits, but also improved deposit control in "cooler" engine regions, in spark-ignition or compression internal combustion engines. For instance, in addition to intake valve control, they also have been discovered to be effective in controlling (i.e., preventing and/or reducing) port fuel injector plugging or direct injector deposits, combustion chamber deposits, and intake port stains. Mannich reaction products of the invention meet and pass not only industry deposit control performance tests concerning intake valves, but also industry tests pertaining to port fuel injectors (viz., ASTM D-6421, PFI rig tests), which compares well with comparison Mannich detergents which have failed the PFI rig test.

In an aspect of the invention, the Mannich reaction products can provide at least the same or improved IVD performance as compared to other Mannich reaction products obtained at other molar ratios (1:1:1, 1:2:1 etc.), when tested on the 2.3 liter Ford engine test or, for instance, the Dodge Intrepid engine. This IVD performance can be obtained while also gaining improved PFI rig performance.

In an aspect of the invention, the Mannich reaction products are substantially pure and are not complex multi-component, multi-by-product mixtures as may be obtained when the Mannich reaction is conducted using molar ratios substantially deviating from the present ratio.

In an aspect of the invention, the Mannich reaction products can be prepared in one reaction vessel, sometimes referred to as a one-pot reaction process.

In one embodiment, a polyamine having primary amino group used in the Mannich reaction may be selected from (A) aliphatic cyclic polyamines having primary amino groups, and (B) acyclic aliphatic polyamines having primary amino groups, or combinations thereof. By preference, the primary amines are on adjacent carbon atoms, or on carbon atoms separated by a methylene group, provided the polyamine selected is capable of forming a 5-member or 6-member heterocyclic ring having two nitrogen atoms in the ring in the reaction scheme as described herein.

In another embodiment, a Mannich reaction product is obtained by reacting (i) 1,2-diaminocyclohexane, 1,3 diamino propane or 1,2-diamino ethane (ii) polyisobutylene-substituted cresol and/or phenol, and (iii) formaldehyde, wherein the Mannich reaction is conducted at an overall molar ratio of (i):(ii):(iii) of approximately 1:2:3.

In another embodiment, a Mannich reaction product is obtained by reacting (i) 1,2-diaminocyclohexane, 1,3 diamino propane or 1,2-diamino ethane (ii) polyisobutylene-substituted cresol and/or phenol, and (iii) formaldehyde, wherein the Mannich reaction is conducted at an overall molar ratio of (i):(ii):(iii) of approximately 1:1:2.

The Mannich reaction product may be dispersed in a liquid carrier to provide a fuel additive concentrate for hydrocarbon engine fuels. In an aspect of this embodiment, an exemplary fuel additive composition comprises (a) a Mannich reaction product obtained by reacting (i) a polyamine having primary amino groups that is capable of forming a substantially pure intermediate in the Mannich condensation reaction, said intermediate having a 5-member or 6-member nitrogen-containing heterocyclic moiety, (ii) a hydrocarbyl-substituted hydroxyaromatic compound, and (iii) an aldehyde, wherein the reaction is conducted using a molar ratio of (i):(ii):(iii) such that said polyamine (i) is reactable with the hydrocarbyl-substituted hydroxyaromatic compound (ii) so as to obtain the substantially pure intermediate, which intermediate is reactable with the aldehyde (iii) to obtain the Mannich reaction product as a substantially pure product; and (b) a liquid carrier.

Still another embodiment includes fuels for spark ignition and compression engines into which have been blended the various Mannich reaction products and/or additive concentrates of this invention described herein, and methods for controlling (i.e., preventing or reducing) engine valve deposits in a number of engine locations including one or more of the intake valves, the port fuel injectors, gasoline direct injectors, the combustion chambers, port fuel stain, and so forth, in an internal combustion engine by fueling and/or operating the engine with a fuel composition of this invention. Other embodiments and features of this invention will become still further apparent from the ensuing description and appended claims.

DETAILED DESCRIPTION OF THE PREFERRED EMBODIMENTS

Mannich Reaction Product.

Detergent compounds herein are useful as deposit control additives in engine fuels and comprise the Mannich reaction product of: (i) a polyamine having primary amino groups, (ii) a hydrocarbyl-substituted hydroxyaromatic compound, and (iii) an aldehyde at an overall molar ratio (reactants) such that, for example, the polyamine (i) is reactable with said hydrocarbyl-substituted hydroxyaromatic compound (ii) so as to obtain the substantially pure intermediate, which intermediate is reactable with an aldehyde (iii) to obtain the Mannich reaction product as a substantially pure product. By preference, an overall molar ratio of (i):(ii):(iii) can be approximately 1:2:3.

A Mannich reaction product of the present invention is substantially pure. For instance, a Mannich reaction product that can be at least about 80% pure, preferably at least about 85% pure is obtainable. In principle, the Mannich reaction products of the present invention can be at least about 90 to at least about 95% pure.

Reactions of aliphatic diamines with formaldehyde are described in Krassig, Makromol. Chem. 17:119 (1956), with formation of 5-membered rings and 6-membered rings being described in T. Araki et al., Macromolecules, 21:1995 (1988).

Polyamine Amine Groups:

The polyamine reactant used in the Mannich reaction is a polyamine which has a suitably reactive amino group(s) in the same molecule for purposes of supporting the Mannich reaction. The reactive amino group may be a primary or secondary amino group in the molecule, although a primary amino group(s) may be preferred. The polyamines should be capable of forming a substantially pure 5-membered or 6-member nitrogen-containing cyclic intermediate (the intermediate has a 5-membered or six-member heterocyclic moiety having at least two nitrogen atoms in the ring) by reaction with the hydrocarbyl-substituted hydroxy aromatic compound, which intermediate in turn is capable of being reacted with the selected aldehyde to yield a substantially pure Mannich reaction product. As a consequence, the polyamines selected preferably comprise diamines so as to reduce, if not avoid, side-reactions and by-products. By further preference, in a selected diamine the amine groups are primary amine groups respectively bonded to adjacent carbon atoms, or bonded to respective carbon atoms that are spaced apart by an intervening methylene group.

In principle, subject to the provisos and preferences herein, a representative acyclic aliphatic polyamine reactant may include an alkylene polyamine having a primary amino group that is physically sterically-protected to prevent or least significantly hinder its ability to participate in the Mannich condensation reaction, provided the reactant is chosen so as to produce essentially the target intermediate, namely the substantially pure intermediate (the intermediate has a 5-member or six-member heterocyclic moiety having at least two nitrogen atoms in the ring). Such a polyamine may be chosen from among those described in U.S. application Ser. No. 11/336, 037, filed Jan. 20, 2006, the complete disclosure of which is incorporated herein by reference. The amino group generally is attached to either a secondary or tertiary carbon atom in the polyamine compound and be capable of supporting the Mannich reaction. The reactive amino group may be a primary or secondary amino group in the molecule. By preference, the amino groups are primary, and by further preference the selected polyamine lacks other substituents that promote or are capable of forming by-products in a Mannich reaction, which is concordant with the objective of forming a substantially pure intermediate having a 5-member or 6-member heterocyclic moiety that has at least two nitrogen atoms in the ring.

A suitable polyamine useful for a Mannich reaction herein does not require an amino group, such as a primary amino group, to be physically sterically-protected to prevent or least significantly hinder its ability to participate in the Mannich reaction.

Suitable polyamines include aliphatic cyclic polyamines, particularly polyaminocycloalkanes, such as polyaminocyclohexanes, and certain lower alkyl diamines. The polyamine is selected so that a desired substantially pure 5-membered or 6-membered cyclic intermediate is obtainable (a 5-member or six-member heterocyclic moiety having at least two nitrogen atoms in the ring) that in turn is capable of being reacted to yield a substantially pure Mannich reaction product.

The polyaminocyclohexanes may comprise 1,2-diaminocyclohexanes ("DAC"), as an example. 1,2-diaminocyclohexanes, for example, are available as a mixture of isomers, such as cis and trans isomers. Isolated or pure isomer forms thereof also may be used as this reactant.

Acyclic aliphatic polyamines having a primary amino group(s) include ethylene diamine and 1,3-diamino propane. These polyamines can be used to form the desired substantially pure 5-member or 6-member cyclic intermediate, respectively.

Hydrocarbyl-Substituted Hydroxyaromatic Compound.

Representative hydrocarbyl-substituted hydroxyaromatic compounds which can be used in forming the Mannich detergent products of the present invention are represented by the following formula:

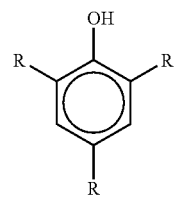

in which each R is H, $C_{1-4}$ alkyl, or a hydrocarbyl substituent having an average molecular weight ($M_w$) in the range of about 300 to about 2,000, particularly about 500 to about 1,500, as determined gel permeation chromatography (GPC), with the proviso that at least one R is H and one R is a hydrocarbyl substituent as defined above.

Representative hydrocarbyl substituents include polyolefin polymers, such as polypropylene, polybutene, polyisobutylene, and ethylene alpha-olefin copolymers. Other similar long-chain hydrocarbyl substituents may also be used. Examples include copolymers of butylene and/or isobutylene and/or propylene, and one or more mono-olefinic comonomers copolymerizable therewith (e.g., ethylene, 1-pentene, 1-hexene, 1-octene, 1-decene, etc.) where the copolymer molecule contains at least 50% by weight, of butylene and/or isobutylene and/or propylene units. The comonomers polymerized with propylene or such butenes may be aliphatic and can also contain non-aliphatic groups, e.g., styrene, o-methylstyrene, p-methylstyrene, divinyl benzene and the like. Thus, in any case the resulting polymers and copolymers used in forming the alkyl-substituted hydroxyaromatic compound are substantially aliphatic hydrocarbon polymers. Polyolefin polymer hydrocarbyl substituents can have at least 20%, particularly at least 50%, and more particularly at least 70% of their olefin double bonds at a terminal position on the carbon chain as the highly reactive vinylidene isomer.

Polybutylene is particularly useful. Unless otherwise specified herein, the term "polybutylene" is used in a generic sense to include polymers made from "pure" or "substantially pure" 1-butene or isobutene, and polymers made from mixtures of two or all three of 1-butene, 2-butene and isobutene. Commercial grades of such polymers may also contain insignificant amounts of other olefins.

Polyisobutylene also is especially useful. So-called high reactivity polyisobutenes having relatively high proportions of polymer molecules having a terminal vinylidene group, i.e., at least 20% of the total terminal olefinic double bonds in the polyisobutene comprise an alkylvinylidene isomer, preferably at least 50% and more preferably at least 70%, formed by methods such as described, for example, in U.S. Pat. No. 4,152,499 and W. German Offenlegungsschrift 29 04 314, are preferred polyalkenes for use in forming the hydrocarbyl substituted hydroxyaromatic reactant. Also suitable for use in forming the long chain substituted hydroxyaromatic reactants of the present invention are ethylene alpha-olefin copolymers having a number average molecular weight of 500 to 3000, wherein at least about 30% of the polymer's chains contain terminal ethylidene unsaturation.

In one embodiment, the hydrocarbyl-substituted hydroxyaromatic compound has one R that is H, one R is $C_{1-4}$ alkyl, and one R is a hydrocarbyl substituent having an average molecular weight in the range of about 300 to about 2,000. By using a substituted hydroxyaromatic compound which has only one site for the Mannich reaction to occur, i.e., only one ortho- or para-position being unsubstituted (i.e., where one R=H) in combination with an amine group, but not all primary amine groups, on a polyamine as defined herein, Mannich detergent products are obtained that are very effective at preventing or even reducing engine deposits in different regions of an internal combustion engine.

In one particular embodiment, the hydrocarbyl-substituted hydroxyaromatic compound can be obtained by alkylating o-cresol with a high molecular weight hydrocarbyl polymer, such as a hydrocarbyl polymer group having an average molecular weight between about 300 to about 2,000, to provide an alkyl-substituted cresol. In a more particular embodiment, o-cresol is alkylated with polyisobutylene having an average molecular weight between about 300 to about 2,000 to provide a polyisobutylene-substituted cresol. In a most particular embodiment, o-cresol is alkylated with polyisobutylene (PIB) having an average molecular weight between about 500 to about 1,500 to provide a polyisobutylene-substituted cresol (PIB-cresol).

In another particular embodiment, the hydrocarbyl-substituted hydroxyaromatic compound can be obtained by alkylating o-phenol with a high molecular weight hydrocarbyl polymer, such as a hydrocarbyl polymer group having an average molecular weight between about 300 to about 2,000, to provide an alkyl-substituted phenol. In a particular embodiment, o-cresol is alkylated with polybutylene having an average molecular weight between about 500 to about 1,500 to provide a polybutylene-substituted cresol.

However, any hydrocarbyl-substituted hydroxyaromatic compound readily reactive in the Mannich condensation reaction may be employed. The hydrocarbyl substituents may contain some residual unsaturation, but in general, are substantially saturated.

The alkylation of the hydroxyaromatic compound is typically performed in the presence of an alkylating catalyst, such as a Lewis acid catalyst (e.g., $BF_3$ or $AlCl_3$), at a temperature in the range of about 30 to about 200° C. For a polyolefin used as the hydrocarbyl substituent, it preferably has a polydispersity in the range of about 1 to about 4, preferably from about 1 to about 2, as determined by GPC. Suitable methods of alkylating the hydroxyaromatic compounds of the present invention are generally well known in the art, for example, as taught in GB 1,159,368 and U.S. Pat. Nos. 4,238,628; 5,300,701 and 5,876,468.

Aldehyde.

Representative aldehydes for use in the preparation of the Mannich base products include aliphatic aldehydes and aromatic aldehydes. The aliphatic aldehydes include $C_1$ to $C_6$ aldehydes, such as formaldehyde, acetaldehyde, propionaldehyde, butyraldehyde, valeraldehyde, and hexanal aldehyde. Aromatic aldehydes which may be used include, e.g., benzaldehyde and salicylaldehyde. Illustrative heterocyclic aldehydes for use herein are furfural and thiophene aldehyde, etc. Also useful are formaldehyde-producing reagents such as paraformaldehyde, or aqueous formaldehyde solutions such as formalin. Most preferred is formaldehyde and formalin.

Synthesis of Mannich Reaction Product.

To prepare the Mannich products of the invention, a Mannich reaction of the polyamine, the hydrocarbyl-substituted hydroxyaromatic compound, and the aldehyde may be conducted at a temperature in a range comparable to that described in U.S. application Ser. No. 11/336,037. A suitable temperature range can be from about 40° C. to about 200° C. It will be appreciated, however, that the reaction may commence at a lower temperature, such as 30° C. The reaction can be conducted in bulk (no diluent or solvent) or in a solvent or diluent. Water is evolved and can be removed by azeotropic distillation during the course of the reaction. For instance the temperature is typically increased, such as to 150° C., when removing the water that is evolved in the reaction. Typical reaction times range from about 3 to about 4 hours, although longer or shorter times can be used as necessary or as desired, as will also be appreciated from co-pending U.S. application Ser. No. 11/336,037.

An exemplary process can start with the addition of a hydrocarbyl-substituted hydroxy aromatic component (ii) to the reaction vessel together with a suitable aromatic solvent to obtain a blend. (Suitable solvents also include non-aromatic solvents, such as heptane, in which case the temperature might differ somewhat as understood by those skilled in the art.) The blend is mixed, such as by stirring, under an inert atmosphere, such under a $N_2$ blanket set a suitable SCFH. A suitable SCFH range is nominally 0.1 to 0.2 SCFH. It is preferred to add the polyamine (i) when the blend is homogeneous and is at a moderate temperature, such as about 40 to about 45° C. By preference, the molar ratio of hydrocarbyl-substituted hydroxy aromatic component (ii) to the polyamine (i) is approximately 2:1. The intermediate obtained is substantially pure and can be used as such without necessitating cumbersome or expensive work-up or isolation. The selected aldehyde, such as formaldehyde, is added. By present preference, the amount of aldehyde (iii) added is such that the molar ratio of (i):(ii):(iii) is approximately 1:2:3. The temperature rises, such as to about 45 to about 50° C. The temperature is increased to less than 100° C., such as about 80° C., and the vessel and its contents can be maintained at such temperature for about 30 minutes to 60 minutes. Distillation can then be conducted using a Dean Stark trap or equivalent apparatus and the temperature is set to an elevated temperature in the range of 130 to about 150° C., such as about 145° C., and it should be appreciated that distillation may start after a period of time to allow the reaction mixture to reach about 95 to 105° C. Once the distillation commences, the gas flow for the inert atmosphere (such as a blanket under $N_2$) can be increased to about 0.1 SCFH to about 1.0 SCFH, such as 0.5 SCFH as an example. The temperature is maintained at the selected elevated temperature for sufficient time, which may be about an additional 2 hours to about 2.5 hours. After distillation, to the reaction product can be added such additional solvent as desired to obtain an additive concentrate (sometimes called an additive package) containing the Mannich reaction product. For instance, an additive concentrate may be prepared by adding a selected solvent(s) so the concentrate contains about 25% solvent. Such a concentrate is conveniently sampled for quality control as well being suitable for engine testing.

An important feature of this invention is the relative molar proportion of the essential reactants in the Mannich reaction. In general, the overall molar ratio of the polyamine (i):hydrocarbyl-substituted hydroxyaromatic compound (ii):aldehyde (iii) such that, for example, the polyamine (i) is reactable with the hydrocarbyl-substituted hydroxyaromatic compound (ii) so as to obtain the substantially pure intermediate, which intermediate is reactable with the aldehyde (iii) to obtain the Mannich reaction product as a substantially pure product. By preference, the overall molar ratio of (i):(ii):(iii) is approximately 1:2:3, as an example. In the present context a molar ratio of approximately 1:2:3 means+/−5%, such as a ratio of 1 mole (+/−5%) to 2 moles (+/−5%) to 3 moles (+/−5%), respectively. The 1:2:3 molar ratio is preferred whereas using approximately equimolar proportions of the three Mannich reaction reactants is not preferred. If less than 1 mole of polyamine and/or less than 1 mole aldehyde are used per mole of hydroxyaromatic compound some reactants, such as the hydroxyaromatic compound, will remain unreacted and the Mannich product will be less active, will be substantially less pure, and can exhibit lower IVD performance and lower performance in the PFI rig test. It has heretofore been considered if higher ratios above about 1:1:1, i.e., polyamine much above 1 mole and/or aldehyde much above 1 mole, are used per mole of a hydroxyaromatic compound, undesired by-products may form or substantial amounts of unreacted polyamine or aldehydes may be present in the finished product or must be stripped from the reaction mixture resulting in a waste of starting materials. The use of the present specified overall molar reactant ratio of approximately 1:2:3 together with the use of the polyamines as selected based on the criteria described herein results in a substantially pure Mannich reaction product having excellent performance capabilities and physical properties.

When performing the reactions the present molar ratio is e relatively easy to maintain and control, and thus may help avoid operator error in commercial production. When performing the reaction in large scale plant reactors, the possibility of losses of the more volatile reactants (polyamine and formaldehyde) can be encountered, as by vaporization into the reactor headspace, entrainment in purge streams as water is being purged from the reaction mixture, etc. typically may occur. Compensating for any such losses so that the liquid reaction mixture contains the reactants in the molar ratio utilized pursuant to this invention is feasible and attractive since a substantially pure Mannich reaction product is obtained. Since the relative molar ratio is controllable and the reaction product is not a complex mixture, but rather is a substantially pure reaction product when the reaction is conducted the present molar ratio, the reaction can be conducted on a large scale with reduced reactant losses while avoiding unduly expensive post-reaction processing. The synthesis should therefore be reasonably practical.

Additive Concentrates and Fuel Compositions.

The Mannich products of this invention are preferably used in combination with a liquid carrier, induction aid or fluidizer. Such carriers can be of various types, such as for example liquid poly-α-olefin oligomers, liquid polyalkene hydrocarbons (e.g., polypropene, polybutene, polyisobutene, or the like), liquid hydrotreated polyalkene hydrocarbons (e.g., hydrotreated polypropene, hydrotreated polybutene, hydrotreated polyisobutene, or the like), mineral oils, liquid poly(oxyalkylene) compounds, liquid alcohols or polyols, liquid esters, and similar liquid carriers or solvents. Mixtures of two or more such carriers or solvents can be employed.

Carrier.

The Mannich products of this invention are preferably used in combination with a liquid carrier, induction aid or fluidizer. Such carriers can be of various types, such as for example liquid poly-α-olefin oligomers, liquid polyalkene hydrocarbons, liquid hydrotreated polyalkene hydrocarbons, mineral oils, liquid poly(oxyalkylene) compounds, liquid alcohols or polyols, liquid esters, and similar liquid carriers or solvents. Mixtures of two or more such carriers or solvents can be employed.

Particular liquid carriers for the Mannich detergents described herein include 1) a mineral oil or a blend of mineral oils, particularly those having a viscosity index of less than about 120, 2) one or a blend of poly-α-olefin oligomers, particularly those having an average molecular weight of about 500 to 1500, 3) polyethers, particularly poly(oxyalkylene) compounds having an average molecular weight in the range of about 500 to about 1500, 4) one or more liquid polyalkylenes, or 5) mixtures of any of 1), 2), 3), and/or 4). Although not limited thereto, these carriers have particularly desirable performance capabilities.

The mineral oil carriers that can be used include paraffinic, naphthenic and asphaltic oils, and can be derived from various petroleum crude oils and processed in any suitable manner. For example, the mineral oils may be solvent extracted or hydrotreated oils. Reclaimed mineral oils can also be used. Hydrotreated oils are the most preferred. Preferably the mineral oil used has a viscosity at 40° C. of less than about 1600 SUS, and more preferably between about 300 and 1500 SUS at 40° C. Paraffinic mineral oils most preferably have viscosities at 40° C. in the range of about 475 SUS to about 700 SUS. For best results it is highly desirable that the mineral oil have a viscosity index of less than about 100, more preferably, less than about 70 and most preferably in the range of from about 30 to about 60.

The poly-α-olefins (PAO) carriers that can be used include hydrotreated and unhydrotreated poly-α-olefin oligomers, i.e., hydrogenated or unhydrogenated products, primarily trimers, tetramers and pentamers of α-olefin monomers, which monomers contain from 6 to 12, generally 8 to 12 and most preferably about 10 carbon atoms. Their synthesis is outlined in Hydrocarbon Processing, February 1982, pages 75 et seq., and in U.S. Pat. Nos. 3,763,244; 3,780,128; 4,172,855; 4,218,330; and 4,950,822. The usual process essentially comprises catalytic oligomerization of short chain linear alpha olefins (suitably obtained by catalytic treatment of ethylene). The poly-α-olefins used as carriers will usually have a viscosity (measured at 100° C.) in the range of 2 to 20 centistokes (cSt). Preferably, the poly-α-olefin has a viscosity of at least 8 cSt, and most preferably about 10 cSt at 100° C. Particularly desirable poly-α-olefins (PAO) include polybutene having an average molecular weight of about 500 to about 1500, and more particularly polyisobutene and/or hydrotreated polyisobutene having an average molecular weight of about 500 to about 1500.

Polyethers that can be used as the carrier are poly(oxyalkylene) compounds having an average molecular weight between about 500 and about 1500, and particularly may include poly(oxyalkylene) compounds which are fuel-soluble compounds which can be represented by the following formula:

$$R_1\text{—}(R_2\text{—}O)_n\text{—}R_3$$

wherein $R_1$ is typically a hydrogen, alkoxy, cycloalkoxy, hydroxy, amino, hydrocarbyl (e.g., alkyl, cycloalkyl, aryl, alkylaryl, aralkyl, etc.), amino-substituted hydrocarbyl, or hydroxy-substituted hydrocarbyl group, $R_2$ is an alkylene group having 2-10 carbon atoms (preferably 24 carbon atoms), $R_3$ is typically a hydrogen, alkoxy, cycloalkoxy, hydroxy, amino, hydrocarbyl (e.g., alkyl, cycloalkyl, aryl, alkylaryl, aralkyl, etc.), amino-substituted hydrocarbyl, or hydroxy-substituted hydrocarbyl group, and n is an integer from 1 to 500 and preferably in the range of from 3 to 120 representing the number (usually an average number) of repeating alkyleneoxy groups. In compounds having multiple —$R_2$—O— groups, $R_2$ can be the same or different alkylene group and where different, can be arranged randomly or in blocks. Preferred poly(oxyalkylene) compounds are monools comprised of repeating units formed by reacting an alcohol with one or more alkylene oxides, preferably one alkylene oxide.

The average molecular weight of the poly(oxyalkylene) compounds used as carrier fluids is preferably in the range of from about 500 to about 3000, more preferably from about 750 to about 2500, and most preferably from above about 1000 to about 2000.

One useful sub-group of poly(oxyalkylene) compounds is comprised of the hydrocarbyl-terminated poly(oxyalkylene) monools such as are referred to in the passage at column 6, line 20 to column 7 line 14 of U.S. Pat. No. 4,877,416 and references cited in that passage, said passage and said references being incorporated herein by reference as if fully set forth.

A preferred sub-group of poly(oxyalkylene) compounds is comprised of one or a mixture of alkylpoly(oxyalkylene) monools which in its undiluted state is a gasoline-soluble liquid having a viscosity of at least about 70 centistokes (cSt) at 40° C. and at least about 13 cSt at 100° C. Of these compounds, monools formed by propoxylation of one or a mixture of alkanols having at least about 8 carbon atoms, and more preferably in the range of about 10 to about 18 carbon atoms, are particularly preferred.

The poly(oxyalkylene) carriers used in the practice of this invention preferably have viscosities in their undiluted state of at least about 60 cSt at 40° C. (more preferably at least about 70 cSt at 40° C.) and at least about 11 cSt at 100° C. (more preferably at least about 13 cSt at 100° C.). In addition, the poly(oxyalkylene) compounds used in the practice of this invention preferably have viscosities in their undiluted state of no more than about 400 cSt at 40° C. and no more than about 50 cSt at 100° C. More preferably, their viscosities will not exceed about 300 cSt at 40° C., and will not exceed about 40 cSt at 100° C. The most preferred poly(oxyalkylene) compounds will have viscosities of no more than about, 200 cSt at 40° C., and no more than about 30 cSt at 100° C.

Preferred poly(oxyalkylene) compounds are poly(oxyalkylene) glycol compounds and monoether derivatives thereof that satisfy the above viscosity requirements and that are comprised of repeating units formed by reacting an alcohol or polyalcohol with an alkylene oxide, such as propylene oxide and/or butylene oxide with or without use of ethylene oxide, and especially products in which at least 80 mole % of the oxyalkylene groups in the molecule are derived from 1,2-propylene oxide. Details concerning preparation of such poly(oxyalkylene) compounds are referred to, for example, in Kirk-Othmer, Encyclopedia of Chemical Technology, Third Edition, Volume 18, pages 633-645 (Copyright 1982 by John Wiley & Sons), and in references cited therein, the foregoing excerpt of the Kirk-Othmer encyclopedia and the references cited therein being incorporated herein in toto by reference. U.S. Pat. Nos. 2,425,755; 2,425,845; 2,448,664; and 2,457,139 also describe such procedures, and are also incorporated herein by reference as if fully set forth herein.

A particularly preferred sub-group of poly(oxyalkylene) compounds is comprised of one or a mixture of alkylpoly(oxyalkylene)monools which in its undiluted state is a gasoline-soluble liquid having a viscosity of at least about 70 centistokes (cSt) at 40° C. and at least about 13 cSt at 100° C. Typically the maximum viscosities at these temperatures are no more than about 400 cSt at 40° C., and no more than about 50 cSt at 100° C. More preferably, their viscosities will not exceed about 300 cSt at 40° C. and will not exceed about 40 cSt at 100° C. The most preferred poly(oxyalkylene) compounds will have viscosities of no more than about 200 cSt at 40° C., and no more than about 30 cSt at 100° C. Of these compounds, monools formed by propoxylation of one or a mixture of alkanols having at least about 8 carbon atoms, and more preferably in the range of about 10 to about 18 carbon atoms, are particularly preferred.

The poly(oxyalkylene) compounds used pursuant to this invention contains a sufficient number of branched oxyalkylene units (e.g., methyldimethyleneoxy units and/or ethyldimethyleneoxy units) to render the poly(oxyalkylene) compound gasoline soluble.

Another group of carrier fluids is the liquid polyalkylenes such as polypropenes, polybutenes, polyisobutenes, polyamylenes, copolymers of propene and butene, copolymers of butene and isobutene, copolymers of propene and isobutene and copolymers of propene, butene and isobutene, or their mixtures. Other useful polyalkylenes include hydrotreated polypropene, hydrotreated polybutene, hydrotreated polyisobutene, or the like. Preferred polyalkylene carrier fluids include polybutenes having a molecular weight distribution of less than 1.4 as taught in U.S. Pat. No. 6,048,373. Use of materials of this general type together with other carrier fluids is described for example, in U.S. Pat. Nos. 5,089,028 and 5,114,435, the disclosures of which are incorporated herein by reference.

In some cases, the Mannich base detergent/dispersant can be synthesized in the carrier fluid. In other instances, the preformed detergent/dispersant is blended with a suitable amount of the carrier fluid. If desired, the detergent/dispersant can be formed in a suitable solvent or carrier fluid and then blended with an additional quantity of the same or a different carrier fluid.

The proportion of the liquid carrier used relative to the Mannich base in the preferred additive packages and fuel compositions of this invention is such that the fuel composition when consumed in an engine results in improved intake valve cleanliness as compared to intake valve cleanliness of the same engine operated on the same composition except for being devoid of the liquid carrier. Thus in general, the weight ratio of carrier fluid to Mannich base detergent/dispersant on an active ingredient basis, i.e. excluding solvent(s), if any, used in the manufacture of the Mannich base either during or after its formation but before addition of the carrier fluid, will usually fall within the range of about 0.3:1 to about 2.0:1, and preferably within the range of about 0.5:1 to about 1.5:1.

Typically the additive concentrates of this invention contain from about 12 to about 69 wt %, and preferably from about 22 to about 50 wt % of the Mannich base detergent/dispersant on an active ingredient basis. The additive concentrates may also contain carrier fluid, the level of which is determined by the desired carrier to Mannich base detergent/dispersant ratio.

When formulating the fuel compositions of this invention, the Mannich product and carrier fluid (with or without other additives) are employed in amounts sufficient to reduce or inhibit deposit formation in an internal combustion engine. Thus the fuels will contain minor amounts of the Mannich base detergent/dispersant and of the liquid carrier fluid proportioned as above that control or reduce formation of engine deposits, especially intake system deposits, and most especially intake valve deposits in spark-ignition internal combustion engines. Generally speaking the fuels of this invention will contain on an active ingredient basis as defined above, an amount of the Mannich base detergent/dispersant in the range of about 5 to about 300 ptb (pounds by weight of additive per thousand barrels by volume of fuel), and preferably in the range of about 10 to about 200 ptb. In the preferred fuel compositions wherein a liquid carrier fluid is used, the total amount of carrier fluid will preferably be present in an amount of from about 0.3 to about 2.0 parts by weight per part by weight of Mannich detergent/dispersant (on an active ingredient basis), more preferably the carrier fluid will be present in an amount of from about 0.4 to 1.0 parts by weight per one part of Mannich detergent/dispersant.

Other Additives.

Other optional additives, such as one or more fuel-soluble antioxidants, demulsifying agents, rust or corrosion inhibitors, metal deactivators, combustion modifiers, alcohol co-solvents, octane improvers, emission reducers, friction modifiers, lubricity additives, ancillary detergent/dispersant additives, biocides, antistatic additives, drag reducing agents, dehazers, anti-knock additives, anti-icing agents, anti-valve seat recession additives, combustion improvers, markers, dyes and multifunctional additives (e.g., methylcyclopentadienyl manganese tricarbonyl and/or other cyclopentadienyl manganese tricarbonyl compounds) can also be included in the fuels and additive concentrates of this invention. Whatever components are selected for use in the compositions of this invention, each component should be present in an amount at least sufficient for it to exert its intended function or functions in the finished fuel composition.

In a preferred embodiment, the additive concentrates additionally contain at least one inert hydrocarbon solvent having a boiling point below about 200° C.

Base Fuels.

The base fuels used in formulating the fuels of this invention are any and all base fuels suitable for use in the operation of spark ignition internal combustion engines such as unleaded motor and aviation gasolines, and so-called reformulated gasolines which typically contain both hydrocarbons of the gasoline boiling range and fuel-soluble oxygenated blending components such as alcohols, ethers, and other suitable oxygen-containing organic compounds. Preferred blending agents include fuel-soluble alkanols such as methanol, ethanol, and their higher homologs, and fuel-soluble ethers such as methyl tertiary butyl ether, ethyl tertiary butyl ether, methyl tertiary amyl ether, and analogous compounds, and mixtures of such materials. Oxygenates, when used, will normally be present in the base fuel in an amount below about 25% by volume, and preferably in an amount that provides an oxygen content in the overall fuel in the range of about 0.5 to about 5 percent by volume. However in the practice of this invention departures from these ranges of proportions are permissible whenever deemed necessary, appropriate or desirable.

The additives used in formulating the preferred fuels of this invention can be blended into the base fuel individually or in various sub-combinations. However, it is preferable to blend all of the components concurrently using an additive concentrate of this invention as this takes advantage of the mutual compatibility afforded by the combination of ingredients when in the form of an additive concentrate. Also use of a concentrate reduces blending time and lessens the possibility of blending errors.

Deposit Formation Control in Internal Combustion Engines.

The fuel additives of the present invention are useful for controlling (i.e., preventing and/or removing) deposits in spark-ignited and compression (e.g. diesel) internal combustion engines. Controlling generally refers to the formation of less deposits but it will be additionally appreciated the present fuel additives can prevent and remove deposits. Although research in the field has tended to focus primarily on intake valve deposit concerns, and also combustion chamber deposits to some extent, the fuel additives of the present invention have been found to be more versatile. They not only can be used to prevent/remove deposits in intake valves, but also have been discovered to be effective in controlling deposits in so-called "cooler" engine regions, such as the port fuel injector in particular. Another application is to prevent gasoline direct injector plugging.

Deposits that form on intake valves and ports can reduce engine power because they may restrict air flow and alter air flow patterns within the cylinder. Cold-start and warm-up driveability also may be adversely affected and exhaust emissions may increase. Other valve deposit problems at intake valves include valve sticking and burned valves. The fuel additives of the present invention are effective in controlling these types of deposits.

Combustion chambers are another engine region of concern for deposit formation. Combustion chamber deposits can increase octane number requirement (ONR), as they tend to increase combustion temperatures and compression ratio. If the engine's ONR increases too much from combustion chamber deposit formation, then the recommended gasoline AKI may not prevent knocking or a loss of power that may accompany knock suppression in vehicles equipped with a knock sensor. Combustion chamber deposit interference (CCDI) and combustion chamber deposit flaking (CCDF) are additional engine deposit problems that can occur in some engines. CCDI may manifest itself as cold engine banging noise, resulting from physical contact between engine deposits on the piston top and cylinder head in some engine designs. CCDF occurs when combustion chamber deposits flake off and lodge between the valve face and valve seat, causing low compression pressures due to poor valve sealing. The fuel additives of the present invention also are effective in controlling these types of deposits.

Fuel injectors and carburetors also are regions of concern where deposit formation can occur. Deposits in the small fuel passages of fuel injectors, such as injector pintle deposits, can reduce fuel flow and alter the spray pattern, which can adversely affect power, fuel economy, and driveability. Deposits can cause similar problems for carbureted engines as carburetors also use small channels and orifices to meter fuel. The fuel additives of the present invention additionally are effective in controlling these types of deposits.

As indicated, the fuel additives of the present invention also are effective in controlling deposits in cooler engine areas. For instance, port fuel injector (PFI) deposits represent another engine area where deposits can adversely impact engine performance. PFI deposits can form, for example, during the hot soak period after the engine has been turned off. Gasoline residue remaining in the injector tip is exposed to an elevated temperature longer than gasoline flowing through the injector normally experiences, which can lead to gasoline degradation that initiates deposit formation. These deposits can restrict fuel flow and disrupt spray pattern by partly obstructing or plugging up metering holes of the gasoline injector tip. The fuel additives of the present invention are effective in preventing deposits from forming or in forming markedly less deposits, and in some cases may reduce the amount of deposits, as examples. Therefore the present fuel additives are effective in controlling these types of deposits that otherwise may arise in cooler engine regions.

The examples that follow are intended to further illustrate, and not limit, embodiments in accordance with the invention. All percentages, ratios, parts, and amounts used and described herein are by weight unless indicated otherwise.

EXAMPLE(S)

The following examples which are presented for purposes of illustration and not limitation.

Model reactions are conducted to facilitate an analysis of the reaction products obtainable according to the present invention. 2,4-dimethyl phenol (2,4-DMPh) is useful as a hydrocarbyl-substituted hydroxyaromatic compound since analysis of the reaction product is more facile, and analytical techniques, such as NMR and mass spec as examples, are more readily performed so to confirm purities that are obtainable in accordance with the present invention. Model reactions are described in Examples 1, 2 and 3.

Example 1

A model Mannich reaction product is prepared by reacting ethylene diamine ("EDA"), a 2,4-dimethylphenol (2,4-DMPh) and formaldehyde ("FA"). The mole ratio of EDA:2,4-DMPh:FA used in the Mannich reaction is approximately 1.0:2.0:3.0. The EDA, 2,4-DMPh, and FA are reacted in the following manner in a round bottom flask ("RBF") equipped with mechanized stirring, nitrogen feed, a Dean-Stark trap, and a heating mantle. Solvent (such as toluene) and the 2,4-DMPh are introduced into the RBF and the mixture is stirred while under an inert atmosphere (nitrogen blanket, about 0.1 SCFH) under low heat. The mixed materials were stirred to blend the components while being heated to around 80° C., while under a nitrogen gas ($N_2$) blanket. The EDA is added to the RBF. A mild exotherm occurs as the temperature rose to about 55° C. The FA is then slowly added and the RBF and its contents are heated until a temperature of about 80° C. is reached. This temperature is held for about an hour. The temperature is increased to 145° C. for distillation using a Dean Stark trap. Distillation commences in about 30 minutes, at a temperature of approximately 95-105° C. Once distillation begins, the nitrogen gas flow is adjusted to 0.5 SCFH. The temperature is maintained at 145° C. for about an additional 2 to 2.5 hours. Vacuum stripping can be conducted.

Instrumental analysis (such as NMR and mass spec) shows the product is more than 80% pure, and at least about 85% purity is obtainable.

From the total weight of product that remains in the reaction flask after distillation (and vacuum stripping, if conducted), an amount of additional solvent that is needed to bring the final package composition to 25% solvent is calculated and added.

Example 2

A model Mannich reaction product is obtained in a manner similar to Example 1 except that 1,3-diaminopropane is used as the polyamine. Instrumental analysis (such as NMR and mass spec) shows the reaction product is about 95% pure.

Example 3

A model Mannich reaction product is obtained in a manner similar to Example 1, except that 1,2-diaminocyclohexane is used as the polyamine.

The model Mannich reaction products of Examples 1-3 are substantially purer than the products that are obtained at molar ratios of polyamine:2,4DMPh:FA of 1:1:1 or 1:1:2, for example.

Based on the model data, the Mannich reaction products of the present invention can be at least about 80% pure, in general more than at least about 85% pure, as examples, although in principle, a Mannich reaction product of the present invention is obtainable that has a purity of at least about 90 to at least about 95%.

Example 4

A Mannich reaction product is obtained as depicted by the following reaction scheme:

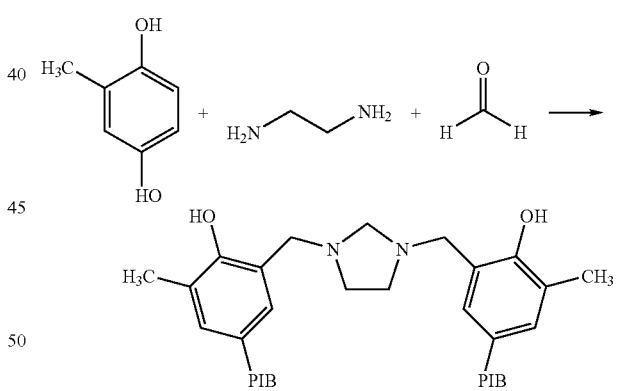

in a manner similar to Example 1 and the general synthesis as described herein, wherein the molar ratio of ethylene diamine to PIB-cresol to formaldehyde when conducting the reaction is approximately 1:2:3. The PIB-cresol is formed by alkylating ortho-cresol with a polyisobutylene having a number average molecular weight of approximately 900. A Mannich reaction product is obtainable having a purity greater than 80%.

Example 5

A Mannich reaction product is obtained as depicted by the following reaction scheme:

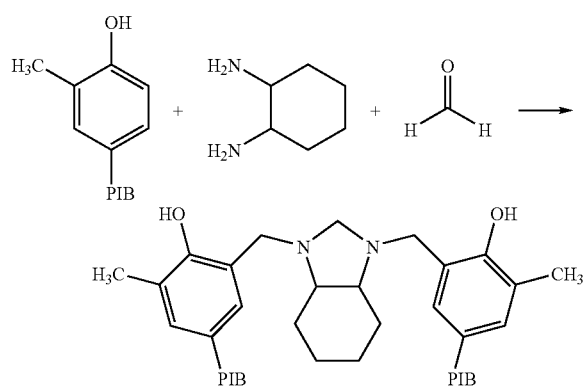

in a manner similar to Example 1 and the general synthesis as described herein, wherein the molar ratio of 1,2-diamino cyclohexane to PIB-cresol to formaldehyde when conducting the reaction is approximately 1:2:3. The PIB-cresol is formed by alkylating ortho-cresol with a polyisobutylene having a number average molecular weight of approximately 900. A Mannich reaction product is obtainable having a purity greater than 80%.

Example 6

A Mannich reaction product is obtained as depicted by the following reaction scheme:

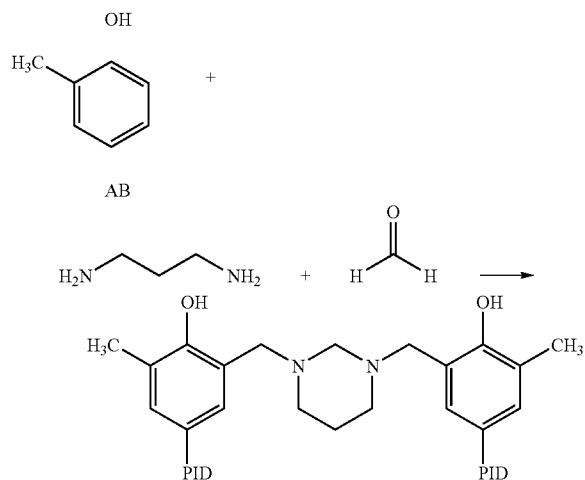

in a manner similar to Example 1 and the general synthesis as described herein, wherein the molar ratio of 1,3-diamino propane to PIB-cresol to formaldehyde when conducting the reaction is approximately 1:2:3. The PTB-cresol is formed by alkylating ortho-cresol with a polyisobutylene having a number average molecular weight of approximately 900. A Mannich reaction product is obtainable having a purity greater than 80%.

Example 7

A Mannich reaction product is made in a manner similar to Example 4 except that the hydrocarbyl hydroxy-substituted aromatic compound is a PIB-phenol. The PIB-phenol is essentially para-substituted, i.e., a phenol is substituted with a reactive PIB moiety at the para-position. The Mannich reaction product is obtainable in a purity of at least about 80%.

Example 8

A Mannich reaction product is made in a manner similar to Example 5 except that the hydrocarbyl hydroxy-substituted aromatic compound is a PIB-phenol (same PIB-phenol as in Example 7). The Mannich reaction product is obtainable in a purity of at least about 80%.

Example 9

A Mannich reaction product is made in a manner similar to Example 6 except that the hydrocarbyl hydroxy-substituted aromatic compound is a PIB-phenol in which the PIB moiety is at the para-position and is a less reactive moiety than the PIB moiety in the PIB-phenol of Example 7. The Mannich reaction product is obtainable in a purity of at least about 80%.

Example 10

A distilled reaction product from each Examples 4, 5, 6, 7, 8, and 9 is used to make exemplary additive concentrates. After distillation, to the total weight of product that remains in the reaction vessel is added an amount of additional solvent needed to bring final package composition to 25% solvent is calculated and adjustment is made accordingly for each of the reaction products of Examples 4-9. Additional suitable ingredients can be included in the additive concentrate, as desired.

Example 11

In a manner similar to Example 1, products are made using a molar ratio of polyamine:hydrocarbyl-substituted hydroxy aromatic compound:aldehyde of 1:1:1, 1:1:2, 1.17:1:1.29, and 10:1:1.2, wherein EDA is the polyamine. In a manner, similar to Example 1, comparison products are made of polyamine:hydrocarbyl-substituted hydroxy aromatic compound:aldehyde using a molar ratio of about 1:1:1 and about 1:1:2, wherein 1,3-diamino propane is the polyamine. In a manner similar to Example 1, a comparison is made at a molar ratio of polyamine:hydrocarbyl-substituted hydroxy aromatic compound:aldehyde of about 1:1:1 in a manner similar to Example 1, wherein 1,2-diaminocyclohexane is the polyamine. Regardless of whether or not, a different solvent may be used, a different solvent is not expected to affect the resultant complex mixture (reaction product), whereby a comparison to a Mannich reaction product according to the present invention is appropriate.

The comparison products are complex mixtures that contain the Mannich reaction product in the mixture. The complex mixture is not readily purified to obtain a substantially pure Mannich reaction product. The Mannich reaction product (compound) is therefore a component in a complex mixture. The Mannich reaction product (compound in a mixture) is therefore quite impure, and its purity is in principle quite low, and a purity (mixture, reaction product) of less than about 50% is a reasonable expectation, for example.

In contrast, in an aspect of the present invention, a Mannich reaction product is substantially free of by-products and unreacted starting materials, and can be characterized as being substantially pure, which enables a more reliable, consistent formulation of an additive package (concentrate) having a more predictable concentration of the actual Mannich reaction product (compound). This also means a fuel can be more reliably formulated to contain a desired amount of the present Mannich reaction product (compound). It should also be appreciated that the present Mannich reaction products are readily prepared on large scale in 'one-pot' with less potential loss of materials and with less potential for variation (fluctuation) in reactant concentration during the synthesis as compared to conventional approaches for making Mannich condensation reaction products.

Performance Tests.

The Mannich reaction products of the present invention and comparison Mannich reaction products can be subjected to various performance tests such as:

I: Intrepid IVD Vehicle Test: intake valve deposit (IVD). This engine cleanliness evaluation IVD test is similar to the standard BMW IVD test (ASTM D 5500) with differences being a Dodge Intrepid engine is used in instead of a BMW engine, and a chassis dyno was used in instead of a road route for mileage accumulations.

II: ASTM D-6421, PFI rig test: port fuel bench test, where the "pass" rate is less than 10% plugging rate;

III: ASTM D-5598, Chrysler Turbocharger PFI test: port fuel injector (PFI) engine test.

IV: CRC Ford 2.3 L IVD test.

V: Mercedes M102E 2.3 L IVD test to represent the European IVD test procedures.

The port fuel injector ("PFI") tests may be modified so that results are reproducible.

These tests provide a direct measure of the level of deposit formation observed to occur in the presence of a particular Mannich detergent.

The treat rates and results for a representative IVD test (2.3 L Ford test) for two representative Mannich reaction products of the present invention are presented Table 1 below. Test 3 is the baseline fuel (Citgo RUL fuel) without a Mannich reaction product of the present invention. A test is conducted for 100 hours.

TABLE 1

FORD 2.3 L IVD @ RICHMOND
100 Hr. Results
CRC Test Procedure

| TEST NO. | Additive | PTB | DEPOSITS, mg. IVD | CCD |
|---|---|---|---|---|
| 1 | None | | 537.9 | 1,487.7 |
| 2 | Ex. 5 | 60.0 | 34.3 | 1,543.8 |
| 3 | Ex. 6 | 56.4 | 39.2 | 1,356.4 |

The product of Ex. 5 in Test No. 2 is an additive (30.4% solids content). The additive combination used is generally 1 part of the Detergent (Mannich) and 0.8 part of a carrier (in this case a polypropylene oxide polymer made by adding propylene oxide to an alkyl phenol).

The product of Ex. 6 in Test No. 3 is an additive concentrate (30.4% solids content). It is formulated in the same manner as the additive in Test No. 2.

New fuel injectors are used at the start of the test.

Oil consumption can be checked to make sure the engine is operating correctly, but is otherwise not a requirement of this test procedure.

CCD (mgs) refers to combustion chamber deposits and it is the total of CHD (cylinder head deposits) and PTD (piston top deposits).

The term PTB refers to pounds of additive per 1000 barrels of fuel.

The treat rates and results for a modified PFI rig test for the two representative Mannich reaction products versus a fuel (conducted twice, Tests 5 and 7) are reported in Table 2 below. (The ATSM D-6421 PFI test is modified by substituting a different injector.)

TABLE 2

PFI Rig Test (modified)

| Test# | Additive | Treat Rate (PTB) | % Flow Loss @44 Cycles (Avg) |
|---|---|---|---|
| 4 | Ex. 5 | 80 | 7.7 |
| 5 | None | None | 19.7 |
| 6 | Ex. 6 | 80 | 8.1 |
| 7 | None | None | 12.8 |

The same fuel is used in Tests 4-7.

A lower flow loss means better performance, and thus less deposit formation.

The additives in Test Nos. 4 and 6 are at the same concentration and in the same carrier. The additive from Example 5 is formulated using the same carrier fluid as in Test 2. The additives are formulated in a ratio of Mannich reaction product to carrier at a ratio of 1 to 0.8. The additive from Example 6 is formulated using the same carrier fluid as in Test 3.

A representative Mannich reaction product of the present invention shows superior and better detergency in the IVD and PFI rig tests as compared to the baseline fuel and also to a commercial Mannich product. This can be shown by the relatively lower amount of deposit formation encountered when using a Mannich product obtainable according to the present invention.

The effectiveness of a Mannich reaction product representing the present invention can also be assessed in the "Mercedes" test, M102E (CEC-05-A-93) engine cleanliness evaluation test. The untreated base fuel is also separately tested using the same standard engine test (Test 10). The treat rates for additives containing a Mannich reaction product representative of the present invention and results for the M102E (CEC-05-A-93) tests are reported in Table 3 below.

TABLE 3

M102E 2.3 L IVDT
60 Hr. Results
European IVD Test Procedure

| TEST# | ADDITIVE | DEPOSITS, mg. IVD | CCD |
|---|---|---|---|
| 8 | Ex. 5 | 20.6 | 864.9 |
| 9 | Ex. 6 | 27.1 | 662.4 |
| 10 | None | 160.6 | 315.8 |

The additives in Test Nos. 8 and 9 are at the same concentration. The additive of Test No. 8 has a solids content of 76.9 and is formulated using the carrier fluid as in Test 2. The additive from Example 6 has a solids content of 76.9 and is formulated using the carrier fluid as in Test 3. The solids content represents the detergent (Mannich reaction product) and carrier mix.

The IVD data for Test No. 10 shows that IVD is significantly, adversely higher when the fuel lacks an additive containing an exemplary effective amount of a Mannich reaction product of the present invention.

The same hydrocarbon fuel is used in Tests 8-10.

Fuel consumption is measured and is about 229 liters in Tests 8 and 9.

The test can use Motorcraft® lube oil (15 W40).

The oil consumption can be measured to make sure the engine is operating correctly, but is otherwise not a requirement of this test procedure.

A head port rating of less than 10 is desired. In general, in conjunction with the tests described herein an average rating of the intake ports can be taken. A head port rating of 10 or less can be considered clean, and can be obtained when an effective amount of a Mannich reaction product of the present invention is added to a fuel. The reaction product is typically in a carrier fluid, i.e., as an additive. In principle, a rating of about 5 or less is obtainable using an additive containing a detergent effective amount of a Mannich reaction product of the present invention.

A Mannich reaction product representing the present invention can provide superior and improved performance in an engine test, which is shown by the reduced amounts of PFI deposits obtained by using it. The results are significantly improved compared to a commercial Mannich product or the untreated base fuel.

A fuel to which a detergent effective amount of a Mannich reaction product of this invention is added can exhibit improved IVD performance.

Mannich reaction products representing the present invention can provide better stain rate when compared to a conventional commercial Mannich additive product.

It is to be understood that the reactants and components referred to by chemical name anywhere in the specification or claims hereof, whether referred to in the singular or plural, are identified as they exist prior to coming into contact with another substance referred to by chemical name or chemical type (e.g., base fuel, solvent, etc.). It matters not what chemical changes, transformations and/or reactions, if any, take place in the resulting mixture or solution or reaction medium as such changes, transformations and/or reactions are the natural result of bringing the specified reactants and/or components together under the conditions called for pursuant to this disclosure. Thus the reactants and components are identified as ingredients to be brought together either in performing a desired chemical reaction (such as a Mannich condensation reaction) or in forming a desired composition (such as an additive concentrate or additized fuel blend). It will also be recognized that the additive components can be added or blended into or with the base fuels individually per se and/or as components used in forming preformed additive combinations and/or sub-combinations. Likewise preformed additive concentrates, in which higher proportions of the additive components are blended together usually with one or more diluents or solvents, can be formed so that subsequently the concentrate can be blended with a base fuel in the course of forming the finished fuel composition. Accordingly, even though the claims hereinafter may refer to substances, components and/or ingredients in the present tense ("comprises", "is", etc.), the reference is to the substance, component or ingredient as it exists or may have existed at the time just before it was first blended or mixed with one or more other substances, components and/or ingredients in accordance with the present disclosure. The fact that the substance, component or ingredient may have lost its original identity through a chemical reaction or transformation during the course of such blending or mixing operations is thus wholly immaterial for an accurate understanding and appreciation of this disclosure and the claims thereof.

As used herein the term "fuel-soluble" means that the substance under discussion should be sufficiently soluble at 20° C. in the base fuel selected for use to reach at least the minimum concentration required to enable the substance to serve its intended function. Preferably the substance will have a substantially greater solubility in the base fuel than this. However, the substance need not dissolve in the base fuel in all proportions.

Each and every patent or other publication referred to in any portion of this specification is incorporated in toto into this disclosure by reference for all purposes, as if fully set forth herein.

This invention is susceptible to considerable variation in its practice. Thus, the foregoing description is not intended to limit, and should not be construed as limiting, the invention to a particular disclosed exemplification hereinabove. Rather, what is intended to be covered is as set forth in the claims and the equivalents thereof permitted as a matter of law.

What is claimed is:

1. A fuel additive composition, comprising
(a) a substantially pure Mannich reaction product obtained by reacting (i) a polyamine having primary amino groups selected from the group consisting of ethylene diamine, 1,3-diamino propane and a 1,2-diaminocycloaliphatic (ii) a hydrocarbyl-substituted hydroxyaromatic compound, and (iii) an aldehyde, wherein the reaction is conducted using a molar ratio of (i):(ii):(iii) of approximately 1:1:2 to provide the substantially pure Mannich reaction product having a purity of at least about 80%; and
(b) a liquid carrier.

2. The fuel additive composition according to claim 1, wherein the polyamine comprises 1,2-diaminocyclohexane.

3. The fuel additive composition according to claim 1, wherein the polyamine comprises ethylene diamine.

4. The fuel additive composition according to claim 1, wherein the polyamine comprises 1,3-diaminopropane.

5. The fuel additive composition according to claim 1, wherein the hydrocarbyl-substituted hydroxyaromatic compound comprises ortho-cresol, or phenol, or mixture of o-cresol and phenol, having an aliphatic hydrocarbyl substituent derived from a polyolefin having an average molecular weight in the range of about 300 to about 2000.

6. The fuel additive composition according to claim 5, wherein the aliphatic hydrocarbyl substituent comprises polyisobutylene.

7. The fuel additive composition according to claim 1 or 5, wherein the aldehyde comprises an aliphatic aldehyde, a heterocyclic aldehyde, an aromatic aldehyde, or mixture thereof.

8. The fuel additive composition according to claim 7, wherein said aldehyde comprises a $C_1$ to $C_6$ aliphatic aldehyde.

9. The fuel additive composition according to claim 7, wherein said aldehyde comprises a heterocyclic aldehyde.

10. The fuel additive composition according to claim 7, wherein said aldehyde comprises an aromatic aldehyde.

11. The fuel additive composition according to claim 1, wherein said aldehyde is at least one selected from the group consisting of formaldehyde, acetaldehyde, propionaldehyde, butyraldehyde, valeraldehyde, and hexanal aldehyde, benzaldehyde and salicylaldehyde.

12. The fuel additive composition according to claim 1, wherein said aldehyde comprises a formaldehyde-producing reagent.

13. The fuel additive composition according to claim 1, wherein said aldehyde is selected from the group consisting of furfural, thiophene aldehyde, paraformaldehyde, and formalin.

14. The fuel additive composition according to claim 1, wherein the carrier is selected from the group consisting of liquid poly-α-olefin oligomers, liquid polyalkene hydrocarbons, liquid hydrotreated polyalkene hydrocarbons, mineral oils, liquid poly(oxyalkylene) compounds, and any mixture thereof.

15. A fuel additive composition, comprising
(a) a Mannich reaction product obtained by reacting (i) a polyamine having primary amino groups that is capable of forming a substantially pure intermediate in the Mannich condensation reaction, said intermediate having a 5-member or 6-member nitrogen-containing heterocyclic moiety, (ii) a hydrocarbyl-substituted hydroxyaromatic compound, and (iii) an aldehyde, wherein the reaction is conducted using a molar ratio of (i):(ii):(iii) of approximately 1:1:2 such that said polyamine (i) is reactable with said hydrocarbyl-substituted hydroxyaromatic compound (II) so as to obtain said substantially pure intermediate, said intermediate being reactable with said aldehyde (iii) to obtain said Mannich reaction product as a substantially pure product having a purity of at least about 80%;
(b) a liquid carrier.

16. A Mannich detergent comprising the substantially pure Mannich reaction product of (i) at least one of 1,2-diaminocyclohexane, ethylene diamine or 1,3-diaminopropane, (ii) polyisobutylene-substituted cresol and/or phenol wherein the polyisobutylene has an average molecular weight of about 300 to about 2,000, and (iii) formaldehyde, wherein the reaction is conducted using a molar ratio of (i):(ii):(iii) of approximately 1:1:2, and wherein the substantially pure Mannich reaction product has a purity of at least about 80%.

17. A substantially pure Mannich reaction product obtained by reacting (i) a polyamine having primary amino groups that is capable of forming a substantially pure intermediate in the Mannich condensation reaction, said intermediate having a 5-member or 6-member nitrogen-containing heterocyclic moiety, (ii) a hydrocarbyl-substituted hydroxyaromatic compound, and (iii) an aldehyde, wherein the reaction is conducted using a molar ratio of (i):(ii):(iii) of approximately 1:1:2 such that said polyamine (i) is reactable with said hydrocarbyl-substituted hydroxyaromatic compound (II) so as to obtain said substantially pure intermediate, said substantially pure intermediate being reactable with said aldehyde (iii) to obtain said substantially pure Mannich reaction product having a purity of at least about 80%.

18. The substantially pure Mannich reaction product according to claim 17, wherein the hydrocarbyl-substituted hydroxyaromatic compound comprises ortho-cresol, or phenol, or mixture of o-cresol and phenol, having an aliphatic hydrocarbyl substituent derived from a polyolefin having an average molecular weight in the range of about 300 to about 2000.

19. The substantially pure Mannich reaction product according to claim 17, wherein the aldehyde comprises an aliphatic aldehyde, a heterocyclic aldehyde, an aromatic aldehyde, or mixture thereof.

20. The substantially pure Mannich reaction product according to claim 19, wherein said aldehyde comprises a $C_1$ to $C_6$ aliphatic aldehyde.

21. The substantially pure Mannich reaction product according to claim 19, wherein said aldehyde comprises a heterocyclic aldehyde.

22. The substantially pure Mannich reaction product according to claim 19, wherein said aldehyde comprises an aromatic aldehyde.

23. The substantially pure Mannich reaction product according to claim 17, wherein said aldehyde is at least one selected from the group consisting of formaldehyde, acetaldehyde, propionaldehyde, butyraldehyde, valeraldehyde, and hexanal aldehyde, benzaldehyde and salicylaldehyde.

24. The substantially pure Mannich reaction product according to claim 17, wherein said aldehyde comprises formaldehyde or a formaldehyde-producing reagent.

25. The substantially pure Mannich reaction product according to claim 17, wherein said aldehyde is selected from the group consisting of furfural, thiophene aldehyde, paraformaldehyde, and formalin.

26. A fuel composition for an internal combustion engine comprising (a) in a major amount, a spark-ignitable combustible hydrocarbon fuel; and (b) a minor amount of a fuel additive containing a Mannich reaction product according to claim 17 in a carrier fluid.

27. A fuel composition for an internal combustion engine, comprising
(a) in major amount, a spark-ignitable combustible hydrocarbon fuel; and
(b) in minor amount, a fuel additive composition comprising a substantially pure Mannich reaction product obtained by reacting (i) a polyamine selected from the group consisting of ethylene diamine, 1,3-diamino propane and 1,2-diamino cyclohexane, (ii) a hydrocarbyl-substituted hydroxyaromatic compound, and (iii) an aldehyde; wherein the reaction is conducted using a molar ratio of (i):(ii):(iii) of approximately 1:1:2 to provide the substantially pure Mannich reaction product having a purity of at least about 80%, wherein the Mannich reaction product is present in an amount sufficient to reduce the weight amount of engine deposits in an internal combustion engine operated on the fuel composition.

28. The fuel composition of claim 27, comprising the fuel additive composition in an amount ranging from about 100 to about 1,000 ppm.

29. The fuel composition of claim 27, wherein the Mannich reaction product is obtained by reacting (1) 1,2-diaminocyclohexane, (2) polyisobutylene-substituted cresol and/or polyisobutylene-substituted phenol or their mixture wherein the polyisobutylene has an average molecular weight of about 300 to about 2,000, and (3) formaldehyde.

30. The fuel composition of claim 27, wherein the Mannich reaction product is obtained by reacting (1) ethylene diamine, (2) polyisobutylene-substituted cresol and/or polyisobutylene-substituted phenol or their mixture wherein the polyisobutylene has an average molecular weight of about 300 to about 2,000, and (3) formaldehyde.

31. The fuel composition of claim 27, wherein the Mannich reaction product is obtained by reacting (1) 1,3-diaminopropane, (2) polyisobutylene-substituted cresol and/or polyisobutylene-substituted phenol or their mixture wherein the polyisobutylene has an average molecular weight of about 300 to about 2,000, and (3) formaldehyde.

32. The fuel composition of claim 27, further comprising at least one additive selected from the group consisting of antioxidants, carrier fluid, demulsifying agents, rust or corrosion inhibitors, metal deactivators, combustion modifiers, alcohol co-solvents, octane improvers, emission reducers, friction modifiers, lubricity additives, ancillary detergent/dispersant additives, biocides, antistatic additives, drag reducing agents, dehazers, anti-knock additives, anti-icing agents, anti-valve seat recession additives, combustion improvers, markers, and dyes.

33. A method of controlling engine deposits in an internal combustion engine comprising operating said engine with said fuel composition of claim 26.

34. The method of claim 33, wherein the controlled engine deposits comprise intake valve deposits.

35. The method of claim 33, wherein the controlled engine deposits comprise port fuel injector deposits.

36. The method of claim 33, wherein the controlled engine deposits comprise combustion chamber deposits.

37. The method of claim 33, wherein the controlled engine deposits comprise intake port stains.

38. The method of claim 33, where the controlled engine deposits comprise direct injector plugging.

39. The fuel additive composition according to claim 15, wherein the polyamine comprises ethylene diamine.

40. The fuel additive composition according to claim 1, wherein the substantially pure Mannich reaction product has a purity of at least about 90%.

41. The fuel additive composition according to claim 40, wherein the substantially pure Mannich reaction product has a purity of at least about 95%.

42. The fuel additive composition according to claim 15, wherein the substantially pure product has a purity of at least about 90%.

43. The fuel additive composition according to claim 42, wherein the substantially pure product has a purity of at least about 95%.

44. The substantially pure Mannich reaction product according to claim 16, wherein the purity is at least about 90%.

45. The substantially pure Mannich reaction product according to claim 44, wherein the purity is at least about 95%.

46. The fuel composition according to claim 17, wherein the substantially pure Mannich reaction product has a purity of at least about 90%.

47. The fuel composition according to claim 46, wherein the substantially pure Mannich reaction product has a purity of at least about 95%.

48. The fuel composition according to claim 27, wherein the substantially pure Mannich reaction product has a purity of at least about 90%.

49. The fuel composition according to claim 48, wherein the substantially pure Mannich reaction product has a purity of at least about 95%.

* * * * *